(12) United States Patent
Pitts (10) Patent No.: US 10,034,468 B1
(45) Date of Patent: Jul. 31, 2018

(54) FISHING ROD CARRYING BAG

(71) Applicant: Blair Pitts, Baton Rouge, LA (US)

(72) Inventor: Blair Pitts, Baton Rouge, LA (US)

( * ) Notice: Subject to any disclaimer, the term of this patent is extended or adjusted under 35 U.S.C. 154(b) by 0 days.

(21) Appl. No.: 15/728,608

(22) Filed: Oct. 10, 2017

(51) Int. Cl.
*A01K 97/10* (2006.01)
*A45F 3/04* (2006.01)

(52) U.S. Cl.
CPC .............. *A01K 97/10* (2013.01); *A45F 3/047* (2013.01); *A45F 2003/045* (2013.01)

(58) Field of Classification Search
CPC .... A45F 3/04; A45F 4/02; A45F 3/047; A45F 3/045; A45F 2003/003; A01K 97/06; A01K 97/08; A01K 97/22
See application file for complete search history.

(56) References Cited

U.S. PATENT DOCUMENTS

| | | | |
|---|---|---|---|
| 4,483,380 A | 11/1984 | Beran | |
| 5,319,874 A | 6/1994 | Vance | |
| 5,409,291 A * | 4/1995 | Lamb | A01K 97/10 224/155 |
| 5,573,166 A * | 11/1996 | Leja | A45F 3/04 224/630 |
| 5,628,443 A * | 5/1997 | Deutsch | A45C 7/0086 150/113 |
| 5,630,537 A * | 5/1997 | Sciacca | A01K 97/06 206/561 |
| D411,660 S | 6/1999 | Antuna | |
| 5,975,393 A * | 11/1999 | Bellamy | A01K 97/08 206/315.11 |
| 6,036,067 A | 3/2000 | Alcorn | |
| 6,048,023 A * | 4/2000 | Lampton | A45C 15/00 297/129 |
| 6,082,757 A * | 7/2000 | Lin | A01K 97/22 16/429 |
| 6,217,113 B1 * | 4/2001 | Knatz | A47C 4/52 224/155 |
| 6,250,470 B1 | 6/2001 | Mackenzie | |
| 6,789,713 B1 | 9/2004 | Redzisz | |
| 8,418,899 B1 * | 4/2013 | Stamps | A45F 3/14 224/251 |
| 8,943,739 B2 * | 2/2015 | Blake, III | A01K 97/06 206/315.11 |
| 8,960,513 B2 * | 2/2015 | Crandall | A45F 3/04 224/576 |
| 2006/0207161 A1 | 9/2006 | Lynn | |
| 2010/0147918 A1 * | 6/2010 | Hensley | B62J 9/001 224/600 |
| 2015/0257377 A1 | 9/2015 | Moore, Jr. | |

* cited by examiner

*Primary Examiner* — Corey Skurdal
(74) *Attorney, Agent, or Firm* — Kyle A. Fletcher, Esq.

(57) ABSTRACT

The fishing rod carrying bag is a luggage item. The fishing rod carrying bag attaches to a person using a plurality of shoulder straps. The fishing rod carrying bag further comprises a rod carrier. The rod carrier secures a plurality of fishing rods to the fishing rod carrying bag.

15 Claims, 5 Drawing Sheets

FISHING ROD CARRYING BAG

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal or domestic articles including hand or travelling articles, more specifically, a pack carried on the body with two adjustable shoulder straps and an adjustable waist strap.

SUMMARY OF INVENTION

The fishing rod carrying bag is a luggage item. The fishing rod carrying bag attaches to a person using a plurality of shoulder straps. The fishing rod carrying bag further comprises a rod carrier. The rod carrier secures a plurality of fishing rods to the fishing rod carrying bag.

These together with additional objects, features and advantages of the fishing rod carrying bag will be readily apparent to those of ordinary skill in the art upon reading the following detailed description of the presently preferred, but nonetheless illustrative, embodiments when taken in conjunction with the accompanying drawings.

In this respect, before explaining the current embodiments of the fishing rod carrying bag in detail, it is to be understood that the fishing rod carrying bag is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fishing rod carrying bag.

It is therefore important that the claims be regarded as including such equivalent construction insofar as they do not depart from the spirit and scope of the fishing rod carrying bag. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
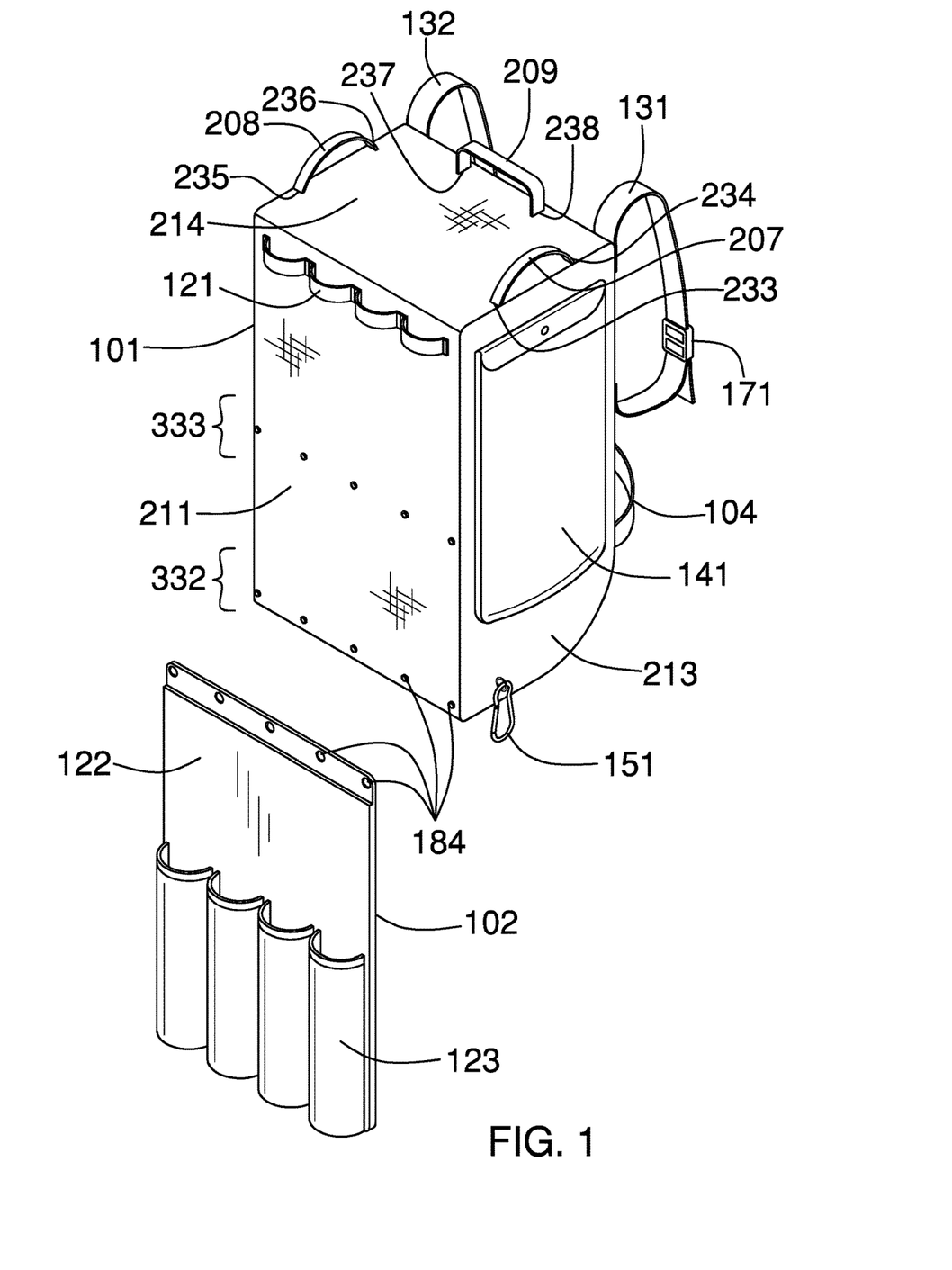
FIG. 1 is an exploded perspective view of an embodiment of the disclosure.
Figure 2:
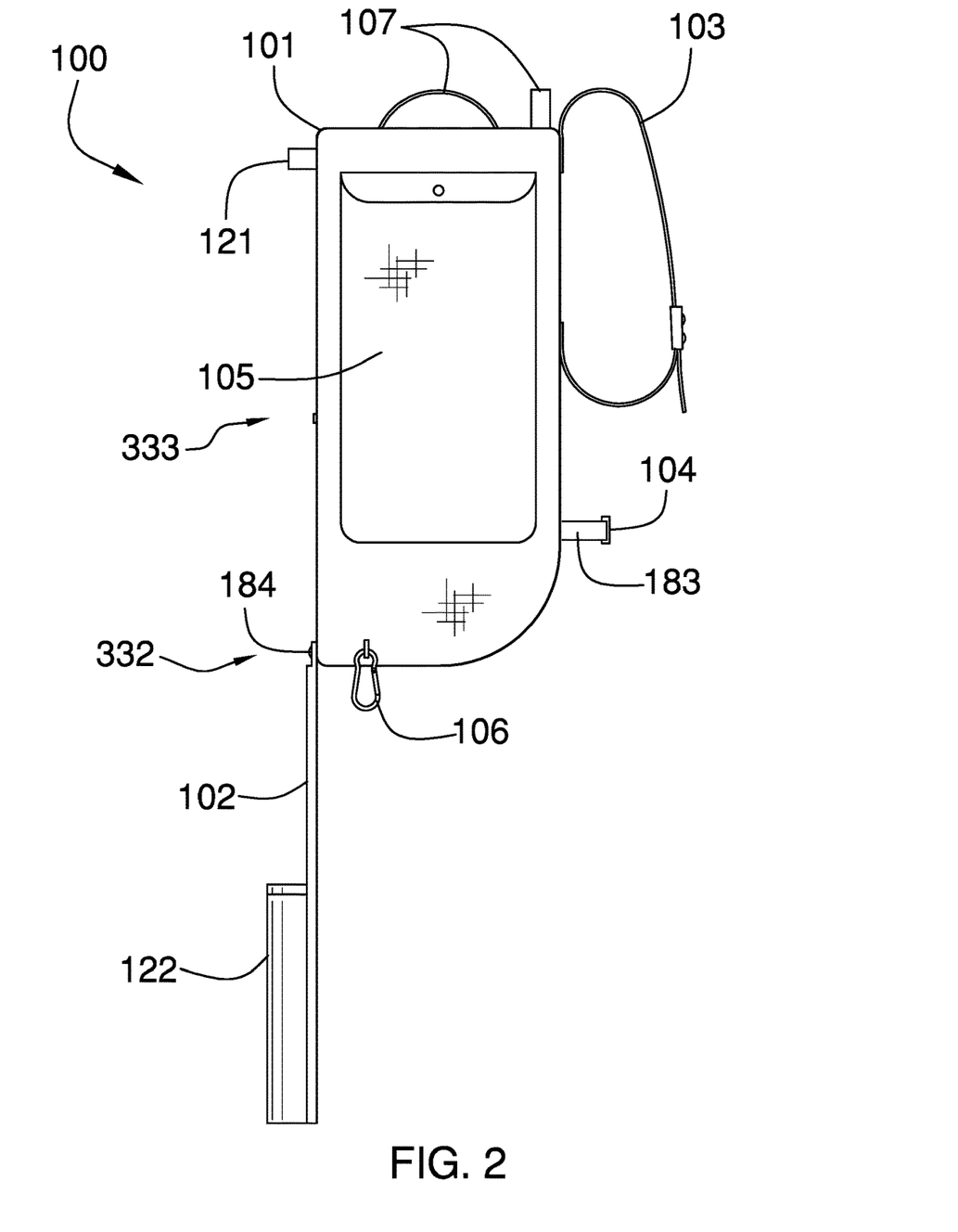
FIG. 2 is a side view of an embodiment of the disclosure.
Figure 3:
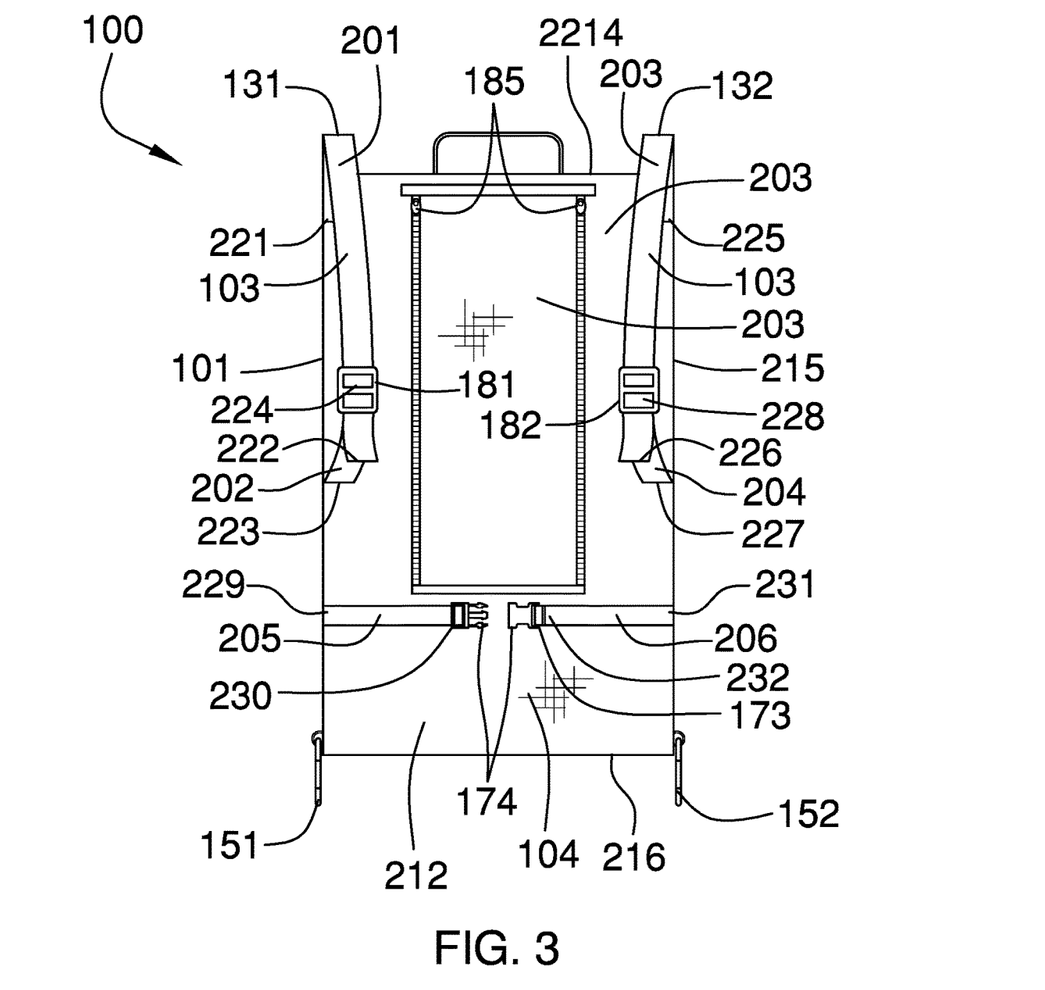
FIG. 3 is a front view of an embodiment of the disclosure.
Figure 4:
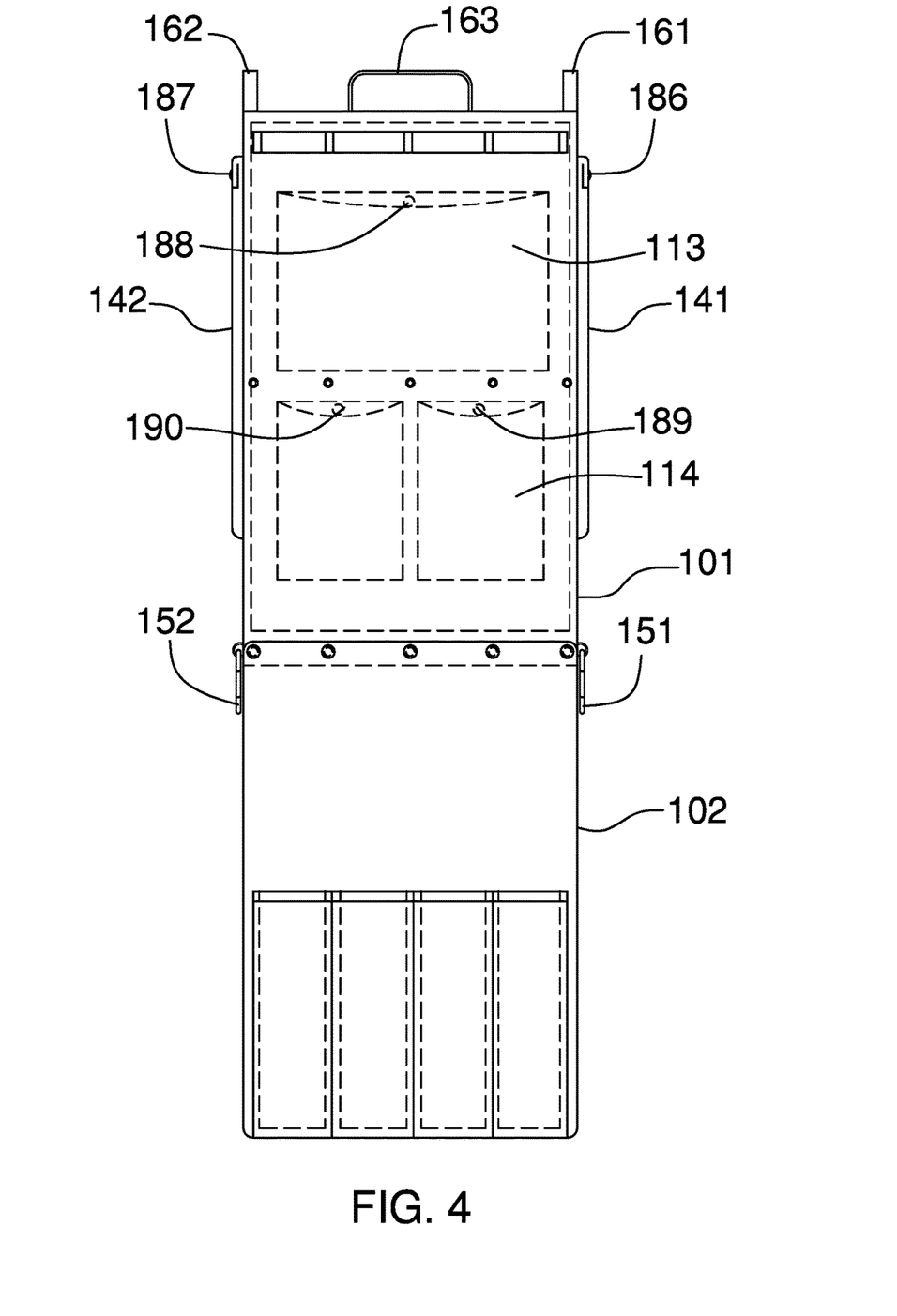
FIG. 4 is a rear view of an embodiment of the disclosure.
Figure 5:
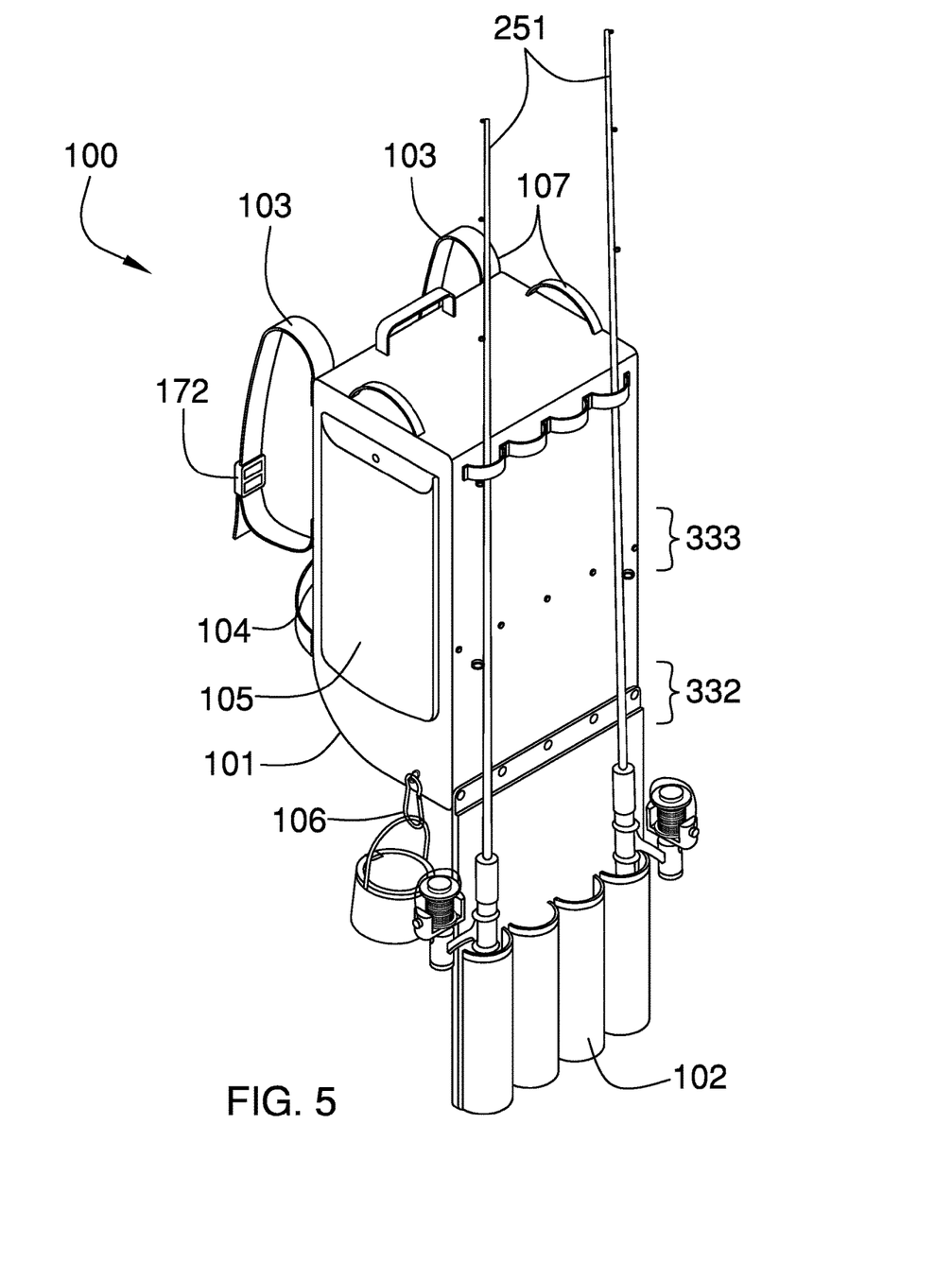
FIG. 5 is an in use view of an embodiment of the disclosure.

Detailed reference will now be made to one or more potential embodiments of the disclosure, which are illustrated in FIGS. 1 through 5.

The fishing rod carrying bag 100 (hereinafter invention) is a luggage item. The invention 100 attaches to a person using a plurality of shoulder straps 103. The invention 100 further comprises a rod carrier 102. The rod carrier 102 secures a plurality of fishing rods 251 to the invention 100. Each of the plurality of fishing rods 251 is a well-known and commercially available device that is used in angling.

The invention 100 comprises a base pack 101, a rod carrier 102, a plurality of shoulder straps 103, and a waist strap 104.

The base pack 101 is the primary containment chamber of the invention 100. The base pack 101 is a hollow rectangular block structure. The base pack 101 comprises a master compartment 111, a master access 112, and a fifth fastener 185. The fifth fastener 185 comprises a commercially available zipper.

The master compartment 111 is a hollow rectangular block structure that: 1) forms the base structure of the invention 100; and, 2) within which fishing equipment may be stored. The master compartment 111 comprises a first interior pocket 113, a second interior pocket 114, and a third interior pocket 115. The master compartment 111 is further defined with a first face 211, a second face 212, a third face 213, a fourth face 214, a fifth face 215, and a sixth face 216. In the first potential embodiment of the disclosure, the brink formed by the second face 212 and the sixth face 216 of the master compartment 111 is rounded.

The master access 112 is a removable barrier that opens and closes an access port into the hollow interior of the master compartment 111. The master access 112 is formed in the second face 212 of the master compartment 111.

The first interior pocket 113 is a pouch that is formed on an interior surface of the master compartment 111. The second interior pocket 114 is a pouch that is formed on an interior surface of the master compartment 111. The third interior pocket 115 is a pouch that is formed on an interior surface of the master compartment 111 Methods to form pockets on a surface are well known in the textile arts.

The first interior pocket 113 comprises an eighth fastener 188. The second interior pocket 114 comprises a ninth fastener 189. The third interior pocket 115 comprises a tenth fastener 190. The eighth fastener 188 comprises a commercially available snap. The ninth fastener 189 comprises a commercially available snap. The tenth fastener 190 comprises a commercially available snap.

Methods to form structures to perform the function of the master compartment 111 are well known and documented in the mechanical and textile arts.

The rod carrier 102 is a structure that attaches to the base pack 101. The rod carrier 102 attaches the plurality of fishing rods 251 to the invention 100 such that the transport of the plurality of fishing rods 251 is hands free. The rod carrier 102 comprises a daisy chain 121, a sheath flap 122, a plurality of sheaths 123, and a fourth fastener 184.

The daisy chain 121 comprises a plurality of loops that are attached to the first face 211 of the master compartment 111 to form a horizontal line. The daisy chain 121 secures the tip of each of the plurality of fishing rods 251 to the master compartment 111. More specifically, each of the plurality of fishing rods 251 corresponds to a loop selected from the daisy chain 121 in a one to one fashion. The tip of any fishing rod selected from the plurality of fishing rods 251 is inserted through the corresponding loop of the daisy chain 121 for storage.

The sheath flap 122 is a commercially available textile sheeting that is cut in a rectangular shape. The sheath flap 122 is hung from the first face 211 of the master compartment 111 at the brink formed by the first face 211 of the master compartment 111 and the sixth face 216 of the master compartment 111. The plurality of sheaths 123 secures the handle of each of the plurality of fishing rods 251 to the master compartment 111. Each sheath selected from the plurality of sheaths 123 is a pocket that is sized to receive the handle of a fishing rod selected from the plurality of fishing rods 251. More specifically, each of the plurality of fishing rods 251 corresponds to a sheath selected from the plurality of sheaths 123 in a one to one fashion. The handle of any fishing rod selected from the plurality of sheaths 123 is inserted into the corresponding sheath of the plurality of sheaths 123 for storage.

The fourth fastener attaches the sheath flap 122 to the base pack 101. In the first potential embodiment of the disclosure, the fourth fastener 184 comprises a plurality of commercially available snaps. It shall be noted that the fourth fastener 184 may involve a first row 332, and a second row 333 on the first face 211 of the base pack 101. The first row 332 is situated below the second row 333 on the first face 211, which enables the rod carrier 102 to attach at differing heights with respect to the base pack 101.

The plurality of shoulder straps 103 and the waist strap 104 forms a harness that attaches the base pack 101 to a person. The plurality of shoulder straps 103 comprises a first shoulder strap 131 and a second shoulder strap 132.

The first shoulder strap 131 is a well-known and documented device that distributes the load of the invention 100 on the shoulder of the wearer. The first shoulder strap 131 comprises a first webbing 201, a second webbing 202, and a first fastener 181. The first webbing 201 is further defined with a first end 221 and a second end 222. The second webbing 202 is further defined with a third end 223 and a fourth end 224.

The first fastener 181 comprises a first ring and slider arrangement 171. The first ring and slider arrangement 171 is a well-known, documented and commercially available device that: 1) is used to adjust the length of a strap; and 2) is used to attach a first strap to a second strap.

The second shoulder strap 132 is a well-known and documented device that distributes the load of the invention 100 on the shoulder of the wearer. The second shoulder strap 132 comprises a third webbing 203, a fourth webbing 204, and a second fastener 182. The third webbing 203 is further defined with a fifth end 225 and a sixth end 226. The fourth webbing 204 is further defined with a seventh end 227 and an eighth end 228.

The second fastener 182 comprises a second ring and slider arrangement 172. The second ring and slider arrangement 172 is a well-known, documented and commercially available device that: 1) is used to adjust the length of a strap; and 2) is used to attach a first strap to a second strap.

The waist strap 104 attaches the master compartment 111 to the waist of the person wearing the invention 100. The waist strap 104 comprises a fifth webbing 205, a sixth webbing 206, and a third fastener 183. The fifth webbing 205 is further defined with a ninth end 229 and a tenth end 230. The sixth webbing 206 is further defined with an eleventh end 231 and a twelfth end 232.

The third fastener 183 comprises a third ring and slider arrangement 173 and a quick release buckle 174. The quick release buckle 174 is selected such that the third ring and slider arrangement 173 is incorporated into the quick release buckle 174. The third ring and slider arrangement 173 is a well-known, documented and commercially available device that: 1) is used to adjust the length of a strap; and 2) is used to attach a first strap to a second strap. The quick release buckle 174 is a well-known, documented and commercially available device that is used to removably attach a first strap to a second strap.

The first fastener 181 attaches the second end 222 of the first webbing 201 to the fourth end 224 of the second webbing 202. The second fastener 182 attaches the sixth end 226 of the third webbing 203 to the eighth end 228 of the fourth webbing 204. The third fastener 183 attaches the tenth end 230 of the fifth webbing 205 to the twelfth end 232 of the sixth webbing 206. The fourth fastener 184 attaches the sheath flap 122 to the first face 211 of the master compartment 111.

The first end 221 of the first webbing 201 attaches to the second face 212 of the master compartment 111 using a sewn seam. The third end 223 of the second webbing 202 attaches to the second face 212 of the master compartment 111 using a sewn seam. The fifth end 225 of the third webbing 203 attaches to the second face 212 of the master compartment 111 using a sewn seam. The seventh end 227 of the fourth webbing 204 attaches to the second face 212 of the master compartment 111 using a sewn seam. The ninth end 229 of the fifth webbing 205 attaches to the second face 212 of the master compartment 111 using a sewn seam. The eleventh end 231 of the sixth webbing 206 attaches to the second face 212 of the master compartment 111 using a sewn seam.

The fifth fastener 185 secures the master access 112 of the base pack 101 to the second face 212 of the master compartment 111.

The eighth fastener 188 secures the first interior pocket 113 by attaching the first interior pocket 113 to the interior surface of the first face 211 of the master compartment 111. The ninth fastener 189 secures the second interior pocket 114 by attaching the second interior pocket 114 to the interior surface of the first face 211 of the master compartment 111. The tenth fastener 190 secures the third interior pocket 115 by attaching the third interior pocket 115 to the interior surface of the first face 211 of the master compartment 111.

In the second potential embodiment of the disclosure, the invention 100 further comprises a plurality of side pockets 105, a plurality of clips 106, and a plurality of hand holds 107.

Each of the plurality of side pockets 105 is a pouch that is formed on the exterior surface of the base pack 101. The plurality of side pockets 105 comprises a first side pocket 141 and a second side pocket 142. The first side pocket 141 is a pouch that is formed on an exterior surface of the base pack 101. The second side pocket 142 is a pouch that is formed on an exterior surface of the base pack 101.

The first side pocket 141 further comprises a sixth fastener 186. The second side pocket 142 further comprises a seventh fastener 187. In the second potential embodiment of the disclosure, the sixth fastener 186 comprises a commercially available snap. The seventh fastener 187 comprises a commercially available snap.

The plurality of clips 106 is a fastener that is used to hang an object from the base pack 101. The plurality of clips 106 comprises a first carabiner 151 and a second carabiner 152. The first carabiner 151 is a readily and commercially available carabiner that is attached to the exterior surface of the base pack 101. The second carabiner 152 is a readily and commercially available carabiner that is attached to the exterior surface of the base pack 101.

Each of the plurality of hand holds 107 is a grip that is used as a handle in moving and carrying the invention 100. The plurality of hand holds 107 comprises a first hand hold 161, a second hand hold 162, and a third hand hold 163.

The first hand hold 161 is a grip that is attached to the fourth face 214 of the base pack 101. The first hand hold 161 comprises a commercially available seventh webbing 207. The seventh webbing 207 is further defined with a thirteenth end 233 and a fourteenth end 234.

The second hand hold 162 is a grip that is attached to the fourth face 214 of the base pack 101. The second hand hold 162 comprises a commercially available eighth webbing 208. The eighth webbing 208 is further defined with a fifteenth end 235 and a sixteenth end 236.

The third hand hold 163 comprises a commercially available ninth webbing 209. The third hand hold 163 is a grip that is attached to the fourth face 214 of the base pack 101. The ninth webbing 209 is further defined with a seventeenth end 237 and an eighteenth end 238.

The sixth fastener 186 secures the first side pocket 141 by attaching the first side pocket 141 to the third face 213 of the master compartment 111. The seventh fastener 187 secures the second side pocket 142 by attaching the second side pocket 142 to the fifth face 215 of the master compartment 111.

The thirteenth end 233 of the seventh webbing 207 attaches to the fourth face 214 of the master compartment 111 using a sewn seam. The fourteenth end 234 of the seventh webbing 207 attaches to the fourth face 214 of the master compartment 111 using a sewn seam. The fifteenth end 235 of the eighth webbing 208 attaches to the fourth face 214 of the master compartment 111 using a sewn seam. The sixteenth end 236 of the eighth webbing 208 attaches to the fourth face 214 of the master compartment 111 using a sewn seam. The seventeenth end 237 of the ninth webbing 209 attaches to the fourth face 214 of the master compartment 111 using a sewn seam. The eighteenth end 238 of the ninth webbing 209 attaches to the fourth face 214 of the master compartment 111 using a sewn seam.

The first side pocket 141 attaches to the third face 213 of the master compartment 111. The first carabiner 151 attaches to the third face 213 of the master compartment 111. The second side pocket 142 attaches to the fifth face 215 of the master compartment 111. The second carabiner 152 attaches to the fifth face 215 of the master compartment 111. Methods to attach pockets to surfaces are well known in the textile arts. Methods to attach carabiners to surfaces are well known in the textile arts.

The following definitions were used in this disclosure:

Brink: As used in this disclosure, a brink refers to the edge or line formed by the intersection of a first plane or surface and a second plane or surface wherein a cant exists between the first plane or surface and the second plane or surface.

Buckle: As used in this disclosure, a buckle is a fastening that is used for joining a first loose end of a strap to a second loose end of the same strap or a different strap. A buckle further comprises a male connector that is attached to a first loose end and a female connector that is attached to a second loose end. The male connector has a pin or other structure that is generally caught by a structure formed in the female connector.

Carabiner: As used in this disclosure, a carabiner is coupling link that is usually formed as an oblong metal ring with one spring hinged side that is used to open and close the ring. Synonyms for carabiner include D-link.

Clip: As used in this disclosure, a clip is a fastener that attaches to an object by gripping or clasping the object. A clip is typically spring loaded.

Correspond: As used in this disclosure, the term correspond means that a first object is in some manner linked to a second object in a one to one relationship.

Exterior: As used in this disclosure, the exterior is use as a relational term that implies that an object is not contained within the boundary of a structure or a space.

Fastener: As used in this disclosure, a fastener is a device that is used to join or affix two objects. Fasteners generally comprise a first element which is attached to the first object and a second element which is attached to the second object such that the first element and the second element join to affix the first object and the second object. Common fasteners include, but are not limited to, hooks, zippers, snaps, buttons, buckles, quick release buckles, or hook and loop fasteners.

Grip: As used in this disclosure, a grip is an accommodation formed within an object that allows the object to be grasped or manipulated by a hand.

Interior: As used in this disclosure, the interior is use as a relational term that implies that an object is contained within the boundary of a structure or a space.

Handle: As used in this disclosure, a handle is an object by which a tool, object, or door is held or manipulated with the hand.

Hands Free: As used in this disclosure, hands free refers to a design characteristic of a device that allows the device to be used or operated without the use of the hands.

Hang: As used in this disclosure, to hang an object is to suspend an object above a surface from above such that the inferior end of the object can move freely.

Harness: As used in this disclosure, a harness is an apparatus comprising a plurality of straps and one or more fasteners that is used to fasten or anchor a first person or first object to a second object. The phrase N point harness refers to the installation of the harness wherein the harness has N anchor points. For example, a 2 point harness has two anchor points while a 5 point harness has 5 anchor points.

Loop: As used in this disclosure, a loop is the length of a first structure including, that is folded or curved to form a closed or nearly closed space such that a linear structure such as a second line, a cord or a hook can be inserted through the space formed within the first structure. Within this disclosure, the first structure is said to be looped around the linear structure.

One to One: When used in this disclosure, a one to one relationship means that a first element selected from first set is in some manner connected to only one element of a second set. A one to one correspondence means that the one to one relationship exists both from the first set the second set and from the second set to the first set. A one to one fashion means that the one to one relationship exists in only one direction.

Pocket: As used in this disclosure, a pocket is a small pouch or storage space that is formed into an object. Pockets are often formed by joining a second textile or a second sheeting to a first textile or a first sheeting, respectively, by sewing or heat sealing respectively.

Quick Release Buckle: As used in this disclosure, a quick release buckle is a specific type of buckle wherein the buckle can be readily and easily disconnected by pressing a button or pinching one of the ends of the quick release buckle. Quick release buckles are readily and commercially available.

Rectangular Block: As used in this disclosure, a rectangular block refers to a three dimensional structure comprising six rectangular surfaces formed at right angles. Within this disclosure, a rectangular block may further comprise rounded edges and corners.

Ring and Slider Arrangement: As used in this disclosure, a ring and slider arrangement is an apparatus comprising a ring component and a slider component that is used to adjust the effective length of a webbing in an application. In the ring and slider arrangement, an end of the webbing is inserted through the slider component, looped through the ring component and then reverse threaded through the slider component for a second time. By adjusting the position of the slider component relative to the webbing, the effective length of the webbing can be adjusted. Ring and slider arrangements are well known and documented in the textile arts.

Rounded: A used in this disclosure, the term rounded refers to the replacement of an apex, vertex, or edge or brink of a structure with a (generally smooth) curvature wherein the concave portion of the curvature faces the interior or center of the structure.

Rounded Rectangle: A used in this disclosure, a rounded rectangle is a rectangle wherein one or more of the corner structures of the rectangle are replaced with a curvature wherein the concave portion of the curvature faces the center of the rounded rectangle.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, or a seam formed using an adhesive.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheath: As used in this disclosure, a sheath is a shell that is used to cover an object and from which the object may be inserted and withdrawn.

Sheeting: As used in this disclosure, sheeting is a material, such as a textile, a plastic, or a metal foil, in the form of a thin flexible layer or layers.

Snap: As used in this disclosure, a snap is a fastener that comprises a male component and a female component. The snap is engaged by pressing the male component into the female component.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Textile: As used in this disclosure, a textile is a material that is woven, knitted, braided or felted. Synonyms in common usage for this definition include fabric and cloth.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

Zipper: As used in this disclosure, a zipper is a fastening device comprising two flexible strips with interlocking components that are opened and closed by pulling a slide along the two flexible strips.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A travel article comprising:
    wherein the travel article comprises a base pack, a rod carrier, a plurality of shoulder straps, and a waist strap;
    wherein the rod carrier, the plurality of shoulder straps, and the waist strap are attached to the rod carrier;
    wherein the travel article is a luggage item;
    wherein the travel article is configured for use with a plurality of fishing rods;
    wherein each of the plurality of fishing rods is further defined with a handle and a tip;
    wherein the base pack is a container;
    wherein the base pack is a hollow rectangular block structure;
    wherein the rod carrier attaches the plurality of fishing rods to the travel article;
    wherein the plurality of shoulder straps and the waist strap forms a harness;
    wherein the base pack comprises a master compartment, a master access, and a fifth fastener;
    wherein the master access is formed in a second face of the master compartment;
    wherein the fifth fastener secures the master access to the master compartment;

wherein the master access is a removable barrier that opens and closes an access port into the hollow interior of the master compartment;
wherein the master compartment is further defined with a first face, a second face, a third face, a fourth face, a fifth face, and a sixth face;
wherein a brink formed by the second face and the sixth face of the master compartment is rounded;
wherein the master compartment comprises a first interior pocket, a second interior pocket, and a third interior pocket;
wherein the first interior pocket is a pouch that is formed on an interior surface of the master compartment;
wherein the second interior pocket is a pouch that is formed on an interior surface of the master compartment;
wherein the third interior pocket is a pouch that is formed on an interior surface of the master compartment;
wherein the first interior pocket comprises an eighth fastener;
wherein the second interior pocket comprises a ninth fastener;
wherein the third interior pocket comprises a tenth fastener;
wherein the rod carrier comprises a daisy chain, a sheath flap, a plurality of sheaths, and a fourth fastener;
wherein the daisy chain attaches to the master compartment;
wherein the plurality of sheaths attach to the sheath flap;
wherein the fourth fastener attaches the sheath flap to the master compartment.

2. The travel article according to claim 1
wherein the daisy chain comprises a plurality of loops that are attached to the first face of the master compartment to form a horizontal line;
wherein the daisy chain secures the tip of each of the plurality of fishing rods to the master compartment.

3. The travel article according to claim 2
wherein each of the plurality of fishing rods corresponds to a loop selected from the daisy chain in a one to one fashion;
wherein the tip of any fishing rod selected from the plurality of fishing rods is inserted through the corresponding loop of the daisy chain.

4. The travel article according to claim 3
wherein the sheath flap is a textile sheeting;
wherein the sheath flap is hung from the first face of the master compartment at the brink formed by the first face of the master compartment and the sixth face of the master compartment;
wherein the plurality of sheaths secures the handle of each of the plurality of fishing rods to the master compartment.

5. The travel article according to claim 4
wherein each sheath selected from the plurality of sheaths is a pocket that is sized to receive the handle of a fishing rod selected from the plurality of fishing rods;
wherein each of the plurality of fishing rods corresponds to a sheath selected from the plurality of sheaths in a one to one fashion;
wherein the handle of any fishing rod selected from the plurality of sheaths is inserted into the corresponding sheath from the plurality of sheaths.

6. The travel article according to claim 5
wherein the plurality of shoulder straps comprises a first shoulder strap and a second shoulder strap;
wherein the first shoulder strap comprises a first webbing, a second webbing, and a first fastener;
wherein the first webbing is further defined with a first end and a second end;
wherein the second webbing is further defined with a third end and a fourth end;
wherein the first fastener attaches the first webbing to the second webbing;
wherein the second shoulder strap comprises a third webbing, a fourth webbing, and a second fastener;
wherein the third webbing is further defined with a fifth end and a sixth end;
wherein the fourth webbing is further defined with a seventh end and an eighth end;
wherein the second fastener attaches the third webbing to the fourth webbing.

7. The travel article according to claim 6
wherein the waist strap comprises a fifth webbing, a sixth webbing, and a third fastener;
wherein the fifth webbing is further defined with a ninth end and a tenth end;
wherein the sixth webbing is further defined with an eleventh end and a twelfth end;
wherein the third fastener attaches the fifth webbing to the sixth webbing.

8. The travel article according to claim 7
wherein the first fastener comprises a first ring and slider arrangement;
wherein the first ring and slider arrangement adjusts the length of the first shoulder strap;
wherein the second fastener comprises a second ring and slider arrangement;
wherein the second ring and slider arrangement adjusts the length of the second shoulder strap;
wherein the third fastener comprises a third ring and slider arrangement and a quick release buckle;
wherein the third ring and slider arrangement adjusts the length of the waist strap;
wherein the quick release buckle removably attaches the fifth strap to the sixth strap.

9. The travel article according to claim 8
wherein the first fastener attaches the second end of the first webbing to the fourth end of the second webbing;
wherein the second fastener attaches the sixth end of the third webbing to the eighth end of the fourth webbing;
wherein the third fastener attaches the tenth end of the fifth webbing to the twelfth end of the sixth webbing;
wherein the fourth fastener attaches the sheath flap to the first face of the master compartment;
wherein the first end of the first webbing attaches to the second face of the master compartment using a sewn seam;
wherein the third end of the second webbing attaches to the second face of the master compartment using a sewn seam;
wherein the fifth end of the third webbing attaches to the second face of the master compartment using a sewn seam;
wherein the seventh end of the fourth webbing attaches to the second face of the master compartment using a sewn seam;
wherein the ninth end of the fifth webbing attaches to the second face of the master compartment using a sewn seam;
wherein the eleventh end of the sixth webbing attaches to the second face of the master compartment using a sewn seam;

wherein the fifth fastener secures the master access of the base pack to the second face of the master compartment;
wherein the eighth fastener secures the first interior pocket by attaching the first interior pocket to the interior surface of the first face of the master compartment;
wherein the ninth fastener secures the second interior pocket by attaching the second interior pocket to the interior surface of the first face of the master compartment;
wherein the tenth fastener secures the third interior pocket by attaching the third interior pocket to the interior surface of the first face of the master compartment.

10. The travel article according to claim 9
wherein the fourth fastener comprises a plurality of snaps;
wherein the fifth fastener comprises a zipper;
wherein the eighth fastener comprises a snap;
wherein the ninth fastener comprises a snap;
wherein the tenth fastener comprises a snap.

11. The travel article according to claim 10
wherein the travel article further comprises a plurality of side pockets, a plurality of clips, and a plurality of hand holds;
wherein the plurality of side pockets, the plurality of clips, and the plurality of hand holds attach to the master compartment.

12. The travel article according to claim 11
wherein each of the plurality of side pockets is a pouch that is formed on the exterior surface of the base pack;
wherein the plurality of side pockets comprises a first side pocket and a second side pocket;
wherein the first side pocket is a pouch that is formed on an exterior surface of the base pack;
wherein the second side pocket is a pouch that is formed on an exterior surface of the base pack;
wherein the first side pocket further comprises a sixth fastener;
wherein the second side pocket further comprises a seventh fastener.

13. The travel article according to claim 12
wherein the plurality of clips is a fastener that is used to hang an object from the base pack;
wherein the plurality of clips comprises a first carabiner and a second carabiner;
wherein the first carabiner attaches to the exterior surface of the base pack;
wherein the second carabiner attaches to the exterior surface of the base pack.

14. The travel article according to claim 13
wherein each of the plurality of hand holds is a grip;
wherein the plurality of hand holds comprises a first hand hold, a second hand hold, and a third hand hold;
wherein the first hand hold comprises a seventh webbing;
wherein the seventh webbing is further defined with a thirteenth end and a fourteenth end;
wherein the second hand hold comprises a commercially available eighth webbing;
wherein the eighth webbing is further defined with a fifteenth end and a sixteenth end;
wherein the third hand hold comprises a commercially available ninth webbing;
wherein the ninth webbing is further defined with a seventeenth end and an eighteenth end.

15. The travel article according to claim 14
wherein the sixth fastener secures the first side pocket by attaching the first side pocket to the third face of the master compartment;
wherein the sixth fastener comprises a snap;
wherein the seventh fastener secures the second side pocket by attaching the second side pocket to the fifth face of the master compartment;
wherein the seventh fastener comprises a snap;
wherein the thirteenth end of the seventh webbing attaches to the fourth face of the master compartment using a sewn seam;
wherein the fourteenth end of the seventh webbing attaches to the fourth face of the master compartment using a sewn seam;
wherein the fifteenth end of the eighth webbing attaches to the fourth face of the master compartment using a sewn seam;
wherein the sixteenth end of the eighth webbing attaches to the fourth face of the master compartment using a sewn seam;
wherein the seventeenth end of the ninth webbing attaches to the fourth face of the master compartment using a sewn seam;
wherein the eighteenth end of the ninth webbing attaches to the fourth face of the master compartment using a sewn seam;
wherein the first side pocket attaches to the third face of the master compartment;
wherein the first carabiner attaches to the third face of the master compartment;
wherein the second side pocket attaches to the fifth face of the master compartment;
wherein the second carabiner attaches to the fifth face of the master compartment.

* * * * *